United States Patent
Engle et al.

(10) Patent No.: US 10,147,233 B2
(45) Date of Patent: Dec. 4, 2018

(54) SYSTEMS AND METHODS FOR GENERATING A 3-D MODEL OF A USER FOR A VIRTUAL TRY-ON PRODUCT

(71) Applicant: glasses.com Inc., Mason, OH (US)

(72) Inventors: Ryan Engle, Pflugerville, TX (US); Darren Turetzky, Cedar Park, TX (US)

(73) Assignee: glasses.com Inc., Mason, OH (US)

( * ) Notice: Subject to any disclaimer, the term of this patent is extended or adjusted under 35 U.S.C. 154(b) by 0 days.

(21) Appl. No.: 14/698,655

(22) Filed: Apr. 28, 2015

(65) Prior Publication Data

US 2015/0235428 A1 Aug. 20, 2015

Related U.S. Application Data

(63) Continuation of application No. 13/774,983, filed on Feb. 22, 2013, now abandoned.
(Continued)

(51) Int. Cl.
*G06T 19/00* (2011.01)
*G06T 17/30* (2006.01)
(Continued)

(52) U.S. Cl.
CPC ............ *G06T 19/006* (2013.01); *G06T 15/04* (2013.01); *G06T 15/08* (2013.01); *G06T 17/30* (2013.01);
(Continued)

(58) Field of Classification Search
CPC ....... G06T 19/006; G06T 17/30; G06T 15/04; G06T 2210/16; G06T 2200/04; G06T 2210/61; G06T 15/08
See application file for complete search history.

(56) References Cited

U.S. PATENT DOCUMENTS 3,927,933 A 12/1975 Humphrey et al.
4,370,058 A 1/1983 Trotscher et al.
(Continued)

FOREIGN PATENT DOCUMENTS

CA 2196280 2/1996
DE 10007705 A1 9/2001
(Continued)

OTHER PUBLICATIONS

Blanz, A Morphable Model for the Synthesis of 3D Faces, 2009, URL: cgm.cs.ntust.edu.tw/A9409004/paper/970416/Morphable%20Model.ppt, pp. 1-27.*
(Continued)

*Primary Examiner* — Said Broome
*Assistant Examiner* — Phuc N Doan
(74) *Attorney, Agent, or Firm* — Sterne, Kessler, Goldstein & Fox P.L.L.C.

(57) ABSTRACT

A computer-implemented method for generating a three-dimensional (3-D) model of a user. A plurality of images of a user are obtained. An angle of view relative to the user pictured in at least one of the plurality of images is calculated. It is determined whether the calculated angle of view matches a predetermined viewing angle. Upon determining the calculated angle of view matches the predetermined viewing angle, at least one of the plurality of images is selected.

31 Claims, 11 Drawing Sheets

Related U.S. Application Data

(60) Provisional application No. 61/650,983, filed on May 23, 2012, provisional application No. 61/735,951, filed on Dec. 11, 2012.

(51) Int. Cl.
  *G06T 15/08* (2011.01)
  *G06T 15/04* (2011.01)

(52) U.S. Cl.
  CPC ...... *G06T 2200/04* (2013.01); *G06T 2210/16* (2013.01); *G06T 2210/61* (2013.01)

(56) References Cited

U.S. PATENT DOCUMENTS

| | | |
|---|---|---|
| 4,467,349 A | 8/1984 | Maloomian et al. |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace et al. |
| 4,786,160 A | 11/1988 | Fuerter et al. |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A * | 10/1993 | Falk ............... G05B 19/4099 345/427 |
| 5,257,198 A | 10/1993 | Van Schoyck et al. |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway et al. |
| 5,983,201 A | 11/1999 | Fay et al. |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens et al. |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Simioni et al. |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider et al. |
| 6,139,143 A | 10/2000 | Brune et al. |
| 6,142,628 A | 11/2000 | Saigo |
| 6,144,388 A | 11/2000 | Bornstein |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |

(56) References Cited

U.S. PATENT DOCUMENTS

| | | |
|---|---|---|
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch |
| 7,034,818 B2 | 4/2006 | Perry et al. |
| 7,043,059 B2 | 5/2006 | Cheatle et al. |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |

(56) References Cited

U.S. PATENT DOCUMENTS

| | | |
|---|---|---|
| 8,307,560 B2 | 11/2012 | Tulin |
| 8,330,801 B2 | 12/2012 | Wang et al. |
| 8,346,020 B2 | 1/2013 | Guntur |
| 8,351,649 B1 | 1/2013 | Medioni et al. |
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |
| 8,411,092 B2 | 4/2013 | Sheblak et al. |
| 8,433,157 B2 | 4/2013 | Nijim et al. |
| 8,447,099 B2 | 5/2013 | Wang et al. |
| 8,459,792 B2 | 6/2013 | Wilson et al. |
| 8,605,942 B2 | 12/2013 | Takeuchi |
| 8,605,989 B2 | 12/2013 | Rudin et al. |
| 8,743,051 B1 | 6/2014 | Moy et al. |
| 8,813,378 B2 | 8/2014 | Grove |
| 2001/0023413 A1 | 9/2001 | Fukuma et al. |
| 2001/0026272 A1 | 10/2001 | Feld et al. |
| 2001/0051517 A1 | 12/2001 | Srietzel |
| 2002/0010655 A1 | 1/2002 | Kjallstrom |
| 2002/0105530 A1 | 8/2002 | Waupotitsch et al. |
| 2002/0149585 A1 | 10/2002 | Kacyra et al. |
| 2003/0001835 A1 | 1/2003 | Dimsdale et al. |
| 2003/0030904 A1 | 2/2003 | Huang |
| 2003/0071810 A1 | 4/2003 | Shoov et al. |
| 2003/0110099 A1 | 6/2003 | Trajkovic et al. |
| 2003/0112240 A1 | 6/2003 | Cerny |
| 2004/0004633 A1 | 1/2004 | Perry et al. |
| 2004/0090438 A1 | 5/2004 | Alliez |
| 2004/0217956 A1 | 11/2004 | Besl et al. |
| 2004/0223631 A1 | 11/2004 | Waupotitsch et al. |
| 2004/0257364 A1 | 12/2004 | Basler |
| 2005/0053275 A1 | 3/2005 | Stokes |
| 2005/0063582 A1 | 3/2005 | Park et al. |
| 2005/0111705 A1 | 5/2005 | Waupotitsch et al. |
| 2005/0128211 A1 | 6/2005 | Berger et al. |
| 2005/0162419 A1* | 7/2005 | Kim ............... G06T 15/00 345/419 |
| 2005/0190264 A1 | 9/2005 | Neal |
| 2005/0208457 A1 | 9/2005 | Fink et al. |
| 2005/0226509 A1 | 10/2005 | Maurer et al. |
| 2006/0012748 A1 | 1/2006 | Periasamy |
| 2006/0017887 A1 | 1/2006 | Jacobson |
| 2006/0067573 A1 | 3/2006 | Parr et al. |
| 2006/0127852 A1 | 6/2006 | Wen |
| 2006/0161474 A1 | 7/2006 | Diamond et al. |
| 2006/0212150 A1 | 9/2006 | Sims |
| 2006/0216680 A1 | 9/2006 | Buckwalter et al. |
| 2007/0013873 A9 | 1/2007 | Jacobson |
| 2007/0091085 A1* | 4/2007 | Wang ............... G06T 17/20 345/420 |
| 2007/0104360 A1 | 5/2007 | Huang |
| 2007/0127848 A1 | 6/2007 | Kim et al. |
| 2007/0160306 A1 | 7/2007 | Ahn et al. |
| 2007/0183679 A1 | 8/2007 | Moroto et al. |
| 2007/0233311 A1 | 10/2007 | Okada et al. |
| 2007/0262988 A1 | 11/2007 | Christensen |
| 2008/0084414 A1 | 4/2008 | Rosel et al. |
| 2008/0112610 A1 | 5/2008 | Israelsen et al. |
| 2008/0136814 A1 | 6/2008 | Chu et al. |
| 2008/0152200 A1 | 6/2008 | Medioni et al. |
| 2008/0162695 A1 | 7/2008 | Muhn et al. |
| 2008/0163344 A1 | 7/2008 | Yang |
| 2008/0170077 A1 | 7/2008 | Sullivan et al. |
| 2008/0201641 A1 | 8/2008 | Xie |
| 2008/0219589 A1 | 9/2008 | Jung et al. |
| 2008/0240588 A1 | 10/2008 | Tsoupko-Sitnikov et al. |
| 2008/0246759 A1 | 10/2008 | Summers |
| 2008/0271078 A1 | 10/2008 | Gossweiler et al. |
| 2008/0278437 A1 | 11/2008 | Barrus et al. |
| 2008/0278633 A1 | 11/2008 | Tsoupko-Sitnikov et al. |
| 2008/0279478 A1 | 11/2008 | Tsoupko-Sitnikov et al. |
| 2008/0280247 A1 | 11/2008 | Sachdeva et al. |
| 2008/0294393 A1 | 11/2008 | Laake et al. |
| 2008/0297503 A1 | 12/2008 | Dickinson et al. |
| 2008/0310757 A1 | 12/2008 | Wolberg et al. |
| 2009/0010507 A1 | 1/2009 | Geng |
| 2009/0040216 A1 | 2/2009 | Ishiyama |
| 2009/0123037 A1 | 5/2009 | Ishida |
| 2009/0129402 A1 | 5/2009 | Moller et al. |
| 2009/0132371 A1 | 5/2009 | Strietzel et al. |
| 2009/0135176 A1 | 5/2009 | Snoddy et al. |
| 2009/0135177 A1 | 5/2009 | Strietzel et al. |
| 2009/0144173 A1 | 6/2009 | Mo et al. |
| 2009/0153552 A1 | 6/2009 | Fidaleo et al. |
| 2009/0153553 A1 | 6/2009 | Kim et al. |
| 2009/0153569 A1 | 6/2009 | Park et al. |
| 2009/0154794 A1 | 6/2009 | Kim et al. |
| 2009/0184960 A1 | 7/2009 | Carr et al. |
| 2009/0185763 A1 | 7/2009 | Park et al. |
| 2009/0219281 A1 | 9/2009 | Maillot |
| 2009/0279784 A1 | 11/2009 | Arcas et al. |
| 2009/0304270 A1 | 12/2009 | Bhagavathy et al. |
| 2009/0310861 A1 | 12/2009 | Lang et al. |
| 2009/0316945 A1 | 12/2009 | Akansu |
| 2009/0316966 A1 | 12/2009 | Marshall et al. |
| 2009/0324030 A1 | 12/2009 | Frinking et al. |
| 2009/0324121 A1 | 12/2009 | Bhagavathy et al. |
| 2010/0030578 A1 | 2/2010 | Siddique et al. |
| 2010/0134487 A1 | 6/2010 | Lai et al. |
| 2010/0138025 A1 | 6/2010 | Morton et al. |
| 2010/0141893 A1 | 6/2010 | Altheimer et al. |
| 2010/0145489 A1 | 6/2010 | Esser et al. |
| 2010/0166978 A1 | 7/2010 | Nieminen |
| 2010/0179789 A1 | 7/2010 | Sachdeva et al. |
| 2010/0191504 A1 | 7/2010 | Esser et al. |
| 2010/0198817 A1 | 8/2010 | Esser et al. |
| 2010/0209005 A1 | 8/2010 | Rudin et al. |
| 2010/0277476 A1 | 11/2010 | Johansson et al. |
| 2010/0293192 A1 | 11/2010 | Suy et al. |
| 2010/0293251 A1 | 11/2010 | Suy et al. |
| 2010/0302275 A1 | 12/2010 | Saldanha et al. |
| 2010/0329568 A1 | 12/2010 | Gamliel et al. |
| 2011/0001791 A1 | 1/2011 | Kirshenboim et al. |
| 2011/0025827 A1 | 2/2011 | Shpunt et al. |
| 2011/0026606 A1 | 2/2011 | Bhagavathy et al. |
| 2011/0026607 A1 | 2/2011 | Bhagavathy et al. |
| 2011/0029561 A1 | 2/2011 | Slaney et al. |
| 2011/0040539 A1 | 2/2011 | Szymczyk et al. |
| 2011/0043540 A1 | 2/2011 | Fancher et al. |
| 2011/0043610 A1 | 2/2011 | Ren et al. |
| 2011/0071804 A1 | 3/2011 | Xie |
| 2011/0075916 A1 | 3/2011 | Knothe et al. |
| 2011/0096832 A1 | 4/2011 | Zhang et al. |
| 2011/0102553 A1 | 5/2011 | Corcoran et al. |
| 2011/0115786 A1 | 5/2011 | Mochizuki |
| 2011/0148858 A1 | 6/2011 | Ni et al. |
| 2011/0157229 A1 | 6/2011 | Ni et al. |
| 2011/0158394 A1 | 6/2011 | Strietzel |
| 2011/0166834 A1 | 7/2011 | Clara |
| 2011/0188780 A1 | 8/2011 | Wang et al. |
| 2011/0208493 A1 | 8/2011 | Altheimer et al. |
| 2011/0211816 A1 | 9/2011 | Goedeken et al. |
| 2011/0227923 A1 | 9/2011 | Mariani et al. |
| 2011/0227934 A1 | 9/2011 | Sharp |
| 2011/0229659 A1 | 9/2011 | Reynolds |
| 2011/0229660 A1 | 9/2011 | Reynolds |
| 2011/0234581 A1 | 9/2011 | Eikelis et al. |
| 2011/0234591 A1 | 9/2011 | Mishra et al. |
| 2011/0249136 A1 | 10/2011 | Levy |
| 2011/0262717 A1 | 10/2011 | Broen et al. |
| 2011/0279634 A1 | 11/2011 | Periyannan et al. |
| 2011/0292034 A1 | 12/2011 | Corazza et al. |
| 2011/0293247 A1 | 12/2011 | Bhagavathy et al. |
| 2011/0304912 A1 | 12/2011 | Broen et al. |
| 2012/0002161 A1 | 1/2012 | Altheimer et al. |
| 2012/0008090 A1 | 1/2012 | Atheimer et al. |
| 2012/0013608 A1 | 1/2012 | Ahn et al. |
| 2012/0016645 A1 | 1/2012 | Altheimer et al. |
| 2012/0021835 A1 | 1/2012 | Keller et al. |
| 2012/0038665 A1 | 2/2012 | Strietzel |
| 2012/0075296 A1 | 3/2012 | Wegbreit et al. |
| 2012/0079377 A1 | 3/2012 | Goossens |

(56) References Cited

U.S. PATENT DOCUMENTS

| | | |
|---|---|---|
| 2012/0082432 A1 | 4/2012 | Ackley |
| 2012/0114184 A1 | 5/2012 | Barcons-Palau et al. |
| 2012/0114251 A1 | 5/2012 | Solem et al. |
| 2012/0121174 A1 | 5/2012 | Bhagavathy et al. |
| 2012/0130524 A1 | 5/2012 | Clara et al. |
| 2012/0133640 A1 | 5/2012 | Chin et al. |
| 2012/0133850 A1 | 5/2012 | Broen et al. |
| 2012/0147324 A1 | 6/2012 | Marin et al. |
| 2012/0158369 A1 | 6/2012 | Bachrach et al. |
| 2012/0162218 A1 | 6/2012 | Kim et al. |
| 2012/0166431 A1 | 6/2012 | Brewington et al. |
| 2012/0170821 A1 | 7/2012 | Zug et al. |
| 2012/0176380 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |
| 2012/0294369 A1 | 11/2012 | Bhagavathy et al. |
| 2012/0294530 A1 | 11/2012 | Bhaskaranand et al. |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0313955 A1 | 12/2012 | Choukroun |
| 2012/0314023 A1 | 12/2012 | Barcons-Palau et al. |
| 2012/0320153 A1 | 12/2012 | Barcons-Palau et al. |
| 2012/0323581 A1 | 12/2012 | Strietzel et al. |
| 2013/0027657 A1 | 1/2013 | Esser et al. |
| 2013/0033482 A1* | 2/2013 | Luisi ............ G06T 19/00 345/419 |
| 2013/0070973 A1 | 3/2013 | Saito et al. |
| 2013/0088490 A1* | 4/2013 | Rasmussen ........ G06T 17/00 345/421 |
| 2013/0135579 A1 | 5/2013 | Krug et al. |
| 2013/0187915 A1 | 7/2013 | Lee et al. |
| 2013/0201187 A1* | 8/2013 | Tong ............ G06T 17/00 345/420 |
| 2013/0271451 A1* | 10/2013 | Tong ............ G06T 17/00 345/419 |
| 2015/0286857 A1* | 10/2015 | Kim ............ G06F 17/30247 382/118 |

FOREIGN PATENT DOCUMENTS

| | | | |
|---|---|---|---|
| EP | 0092364 | | 10/1983 |
| EP | 359596 A1 | | 3/1990 |
| EP | 444902 B2 | | 7/1995 |
| EP | 0994336 A2 | | 4/2000 |
| EP | 1011006 A1 | | 6/2000 |
| EP | 1136869 A1 | | 9/2001 |
| EP | 1138253 A2 | | 10/2001 |
| EP | 1231569 A1 | | 8/2002 |
| EP | 1450201 A1 | | 8/2004 |
| EP | 1728467 A1 | | 12/2006 |
| EP | 1154302 B1 | | 8/2009 |
| EP | 2535887 | | 12/2012 |
| EP | 2615583 | * | 7/2013 ........ G06T 19/20 |
| FR | 2955409 A1 | | 7/2011 |
| FR | 2966038 A1 | | 4/2012 |
| GB | 2449855 A | | 12/2008 |
| JP | 2003345857 A | | 12/2003 |
| JP | 2004272530 A | | 9/2004 |
| JP | 2005269022 A | | 9/2005 |
| KR | 20000028583 | | 5/2000 |
| KR | 200000051217 | | 8/2000 |
| KR | 20040097200 | | 11/2004 |
| KR | 20080086945 | | 9/2008 |
| KR | 20100050052 | | 5/2010 |
| WO | 1993000641 | | 1/1993 |
| WO | 1996004596 | | 2/1996 |
| WO | 1997040342 | | 10/1997 |
| WO | 1997040960 | | 11/1997 |
| WO | 1998013721 | | 4/1998 |
| WO | 1998027861 | | 7/1998 |
| WO | 1998027902 | | 7/1998 |
| WO | 1998035263 | | 8/1998 |
| WO | 1998052189 | | 11/1998 |
| WO | 1998057270 | | 12/1998 |
| WO | 1999056942 | | 11/1999 |
| WO | 1999064918 | | 12/1999 |
| WO | 2000000863 | | 1/2000 |
| WO | 2000016683 | | 3/2000 |
| WO | 2000045348 | | 8/2000 |
| WO | 2000049919 | | 8/2000 |
| WO | 2000062148 | | 10/2000 |
| WO | 2000064168 | | 10/2000 |
| WO | 2001023908 | | 4/2001 |
| WO | 2001032074 | | 5/2001 |
| WO | 2001035338 | | 5/2001 |
| WO | 2001061447 | | 8/2001 |
| WO | 2001067325 | | 9/2001 |
| WO | 2001074553 | | 10/2001 |
| WO | 2001078630 | | 10/2001 |
| WO | 2001088654 | | 11/2001 |
| WO | 2002007845 | | 1/2002 |
| WO | 2002041127 | | 5/2002 |
| WO | 2003079097 | | 9/2003 |
| WO | 2003084448 | | 10/2003 |
| WO | 2007012261 A1 | | 2/2007 |
| WO | 2007017751 A1 | | 2/2007 |
| WO | 2007018017 A1 | | 2/2007 |
| WO | 2008009355 A1 | | 1/2008 |
| WO | 2008009423 A1 | | 1/2008 |
| WO | 2008135178 A1 | | 11/2008 |
| WO | 2009023012 A1 | | 2/2009 |
| WO | 2009043941 A1 | | 4/2009 |
| WO | 2010039976 A1 | | 4/2010 |
| WO | 2010042990 A1 | | 4/2010 |
| WO | 2011012743 A2 | | 2/2011 |
| WO | 2011095917 A1 | | 8/2011 |
| WO | 2011134611 A1 | | 11/2011 |
| WO | 2011147649 | | 12/2011 |
| WO | 2012051654 A1 | | 4/2012 |
| WO | 2012054972 A1 | | 5/2012 |
| WO | 2012054983 A1 | | 5/2012 |

OTHER PUBLICATIONS

Yun Ge, 3D Novel Face Sample Modeling for Face Recognition, Journal of Multimedia, vol. 6, No. 5, Oct. 2011 (Year: 2011).*
Piotraschke, Automated 3D Face Reconstruction from Multiple Images using Quality Measures, CVPR or IEEE Xplore, pp. 3418-3427 (Year: 2016).*
Supplementary European Search Report from European Patent Application No. EP13793686, dated Mar. 14, 2016.
Supplementary European Search Report from European Patent Application No. EP13793957, dated Mar. 15, 2016.
Blanz, Volker et al., "A Morphable Model for the Synthesis of 3D Faces," Computer Graphics Proceedings, Siggraph 99, New York, NY, Aug. 8, 1999, pp. 187-194.
"Ray-Ban's Virtual Glasses Fitting Shop Window—Augmented by Activ'screen and Total Immersion," URL:https://www.youtube.com/watch?v=JFhployxc6Y, Sep. 30, 2010, 1 page.
Shan, Ying et al., "Model-Based Bundle Adjustment with Application to Face Modeling," Proceedings of the Eighth IEEE International Conference on Computer Vision (ICCV), Vancouver, British Columbia, Canada, Jul. 7-14, 2001, and International Conference on Computer Vision, Los Alamitos, California, IEEE Comp. Soc., US, vol. 2, pp. 644-651.
Fua, P., "Using Model-Driven Bundle-Adjustment to Model Heads from Raw Video Sequences," Computer Vision, The Proceedings of the Seventh IEEE International AL Conference, Kerkyra, Greece, Sep. 20-27, 1999, vol. 1, pp. 46-53.

(56) References Cited

OTHER PUBLICATIONS

3D Morphable Model Face Animation, http://www.youtube.com/watch?v=nice6NYb_WA, Apr. 20, 2006.
Visionix 3D iView, Human Body Measurement Newsletter, vol. 1., No. 2, Sep. 2005, pp. 2 and 3.
Blaise Aguera y Arcas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
PCT International Search Report for PCT International Patent Application No. PCT/US2012/068174, dated Mar. 7, 2013.
PCT International Search Report for PCT International Patent Application No. PCT/US2013/042504, dated Aug. 19, 2013.
PCT International Search Report for PCT International Patent Application No. PCT/US2013/042509, dated Sep. 2, 2013.
PCT International Search Report for PCT International Patent Application No. PCT/US2013/042514, dated Aug. 30, 2013.
PCT International Search Report for PCT International Patent Application No. PCT/US2013/042517, dated Aug. 29, 2013.
PCT International Search Report for PCT International Patent Application No. PCT/US2013/042512, dated Sep. 6, 2013.
PCT International Search Report for PCT International Patent Application No. PCT/US2013/042529, dated Sep. 17, 2013.
PCT International Search Report for PCT International Patent Application No. PCT/US2013/042525, dated Sep. 17, 2013.
PCT International Search Report for PCT International Patent Application No. PCT/US2013/042520, dated Sep. 27, 2013.
Tracker, Tracker Help, Nov. 2009.
Sinha et al., GPU-based Video Feautre Tracking and Matching, http::frahm.web.unc.edu/files/2014/01/GPU-based-Video-Feature-Tracking-And Matching.pdf, May 2006.
Dror et al., Recognition of Surface Relfectance Properties form a Single Image under Unknown Real-World Illumination, IEEE, Proceedings of the IEEE Workshop on Identifying Objects Across Variations in Lighting: Psychophysics & Computation, Dec. 2011.
Simonite, 3-D Models Created by a Cell Phone, Mar. 23, 2011, url: http://www.technologyreview.com/news/423386/3-d-models-created-by-a-cell-phone/.
English Machine translation of KR20000028583. May 25, 2000.
English Machine translation of KR200000051217. Aug. 16, 2000.
English Machine translation of KR 20080086945. Sep. 29, 2008.
English Machine translation of KR 20100050052. May 13, 2010.
English abstract and English machine translation of the specification and claims of WO1997040960. Nov. 6, 1997.
English Machine translation of WO2011134611. Nov. 3, 2011.
English Machine translation of WO2008135178. Nov. 13, 2008.
English Machine translation of WO 2008009423. Jan. 24, 2008.
English Machine translation of WO2008009355. Jan. 24, 2008.
English translation of abstract of WO2007018017. Feb. 15, 2007.
English translation of abstract of WO 2007012261. Feb. 1, 2007.
English abstract and English machine translation of the specification and claims of JP 2005269022. Sep. 29, 2005.
English abstract and English machine translation of the specification and claims of JP 2004272530. Sep. 30, 2004.
Fidaleo, Model-Assisted 3D Face Reconstruction from Video, AMFG'07 Analysis and Modeling of Faces and Gestures Lecture Notes in Computer Science vol. 4778, 2007, pp. 124-138.
Garcia-Mateos, Estimating 3D facial pose in video with just three points, CVPRW '08 Computer vision and Pattern Recognition Workshops, 2008.
English abstract and English machine translation of the specification and claims of JP 2003345857. Dec. 5, 2003.
English abstract and English machine translation of the specification and claims of DE 10007705. Sep. 6, 2001.
English abstract and English machine translation of the specification and claims of FR 2966038. Apr. 20, 2012.
English abstract and English machine translation of the specification and claims of EP 1450201. Aug. 25, 2004.
English abstract and English machine translation of the specification and claims of EP0359596. Mar. 21, 1990.
English abstract and English machine translation of the specification and claims of WO 1993000641. Jan. 7, 1993.
English abstract of WO 2001067325. Sep. 13, 2001.
English abstract of WO 2001078630. Oct. 25, 2001.
English abstract of WO 2003084448. Oct. 16, 2003.

* cited by examiner

SYSTEMS AND METHODS FOR GENERATING A 3-D MODEL OF A USER FOR A VIRTUAL TRY-ON PRODUCT

RELATED APPLICATIONS

This application claims priority as a continuation of U.S. patent application Ser. No. 13/774,983 entitled SYSTEMS AND METHODS FOR GENERATING A 3-D MODEL OF A USER FOR A VIRTUAL TRY-ON PRODUCT, filed Feb. 22, 2013, which claims priority to U.S. Application No. 61/650,983, entitled SYSTEMS AND METHODS TO VIRTUALLY TRY-ON PRODUCTS, filed on May 23, 2012; and U.S. Application No. 61/735,951, entitled SYSTEMS AND METHODS TO VIRTUALLY TRY-ON PRODUCTS, filed on Dec. 11, 2012, each of which are incorporated herein in their entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computers have opened up an entire industry of internet shopping. In many ways, online shopping has changed the way consumers purchase products. For example, a consumer may want to know what they will look like in and/or with a product. On the webpage of a certain product, a photograph of a model with the particular product may be shown. However, users may want to see more accurate depictions of themselves in relation to various products.

SUMMARY

According to at least one embodiment, a computer-implemented method for generating a three-dimensional (3-D) model of a user is described. A plurality of images of a user may be obtained. An angle of view relative to the user pictured in at least one of the plurality of images may be calculated. It may be determined whether the calculated angle of view matches a predetermined viewing angle. The predetermined viewing angle may include a plurality of evenly spaced 10-degree rotation steps. Upon determining the calculated angle of view matches the predetermined viewing angle, at least one of the plurality of images may be selected.

In one embodiment, a real-time image of the user may be displayed while obtaining the plurality of images of the user. A guideline may be displayed in relation to the displayed real-time image of the user. A cross-correlation algorithm may be performed to track a feature between two or more of the plurality of images of the user. A 3-D model of the user may be generated from the detected features of the user. Texture coordinate information may be generated from the determined 3-D structure of the user. The texture coordinate information may relate a two-dimensional (2-D) coordinate of each selected image to a 3-D coordinate of the 3-D model of the user. At least one geometry file may be generated to store data related to a 3-D structure, wherein each at least one geometry file comprises a plurality of vertices corresponding to a universal morphable model.

In some configurations, a coefficient may be calculated for each generated geometry file based on the determined 3-D structure of the user. Each generated geometry file may be combined linearly based on each calculated coefficient to generate a polygon mesh of the user. Each selected image may be applied to the generated polygon mesh of the user according to the generated texture coordinate information.

A computing device configured to generate a three-dimensional (3-D) model of a user is also described. The device may include a processor and memory in electronic communication with the processor. The memory may store instructions that are executable by the processor to obtain a plurality of images of a user, calculate an angle of view relative to the user pictured in at least one of the plurality of images, determine whether the calculated angle of view matches a predetermined viewing angle, and upon determining the calculated angle of view matches the predetermined viewing angle, select at least one of the plurality of images.

A computer-program product to generate a three-dimensional (3-D) model of a user is also described. The computer-program product may include a non-transitory computer-readable medium that stores instructions. The instructions may be executable by a processor to obtain a plurality of images of a user, calculate an angle of view relative to the user pictured in at least one of the plurality of images, determine whether the calculated angle of view matches a predetermined viewing angle, and upon determining the calculated angle of view matches the predetermined viewing angle, select at least one of the plurality of images.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
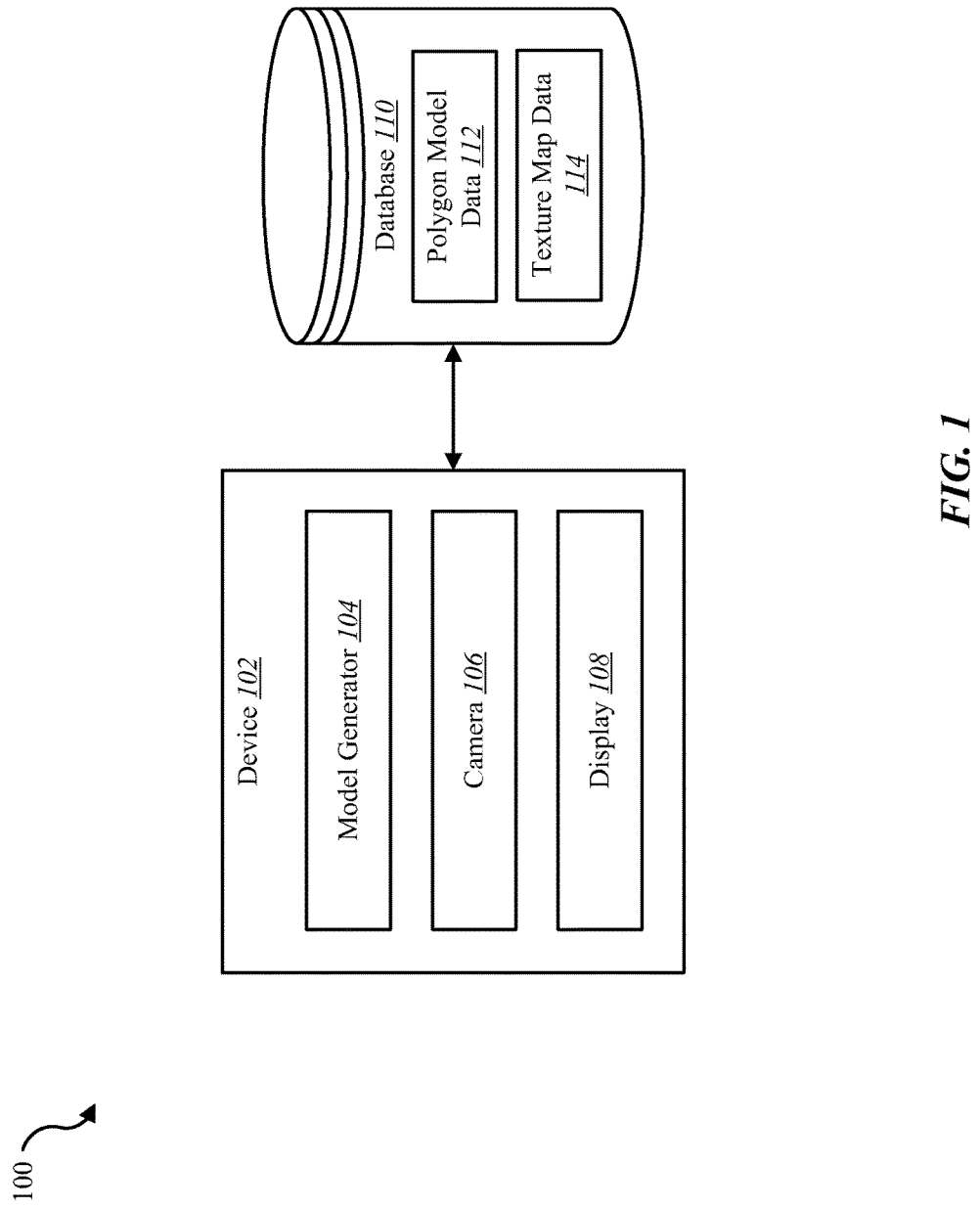
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to the virtually trying-on of products. Three-dimensional (3-D) computer graphics are graphics that use a 3-D representation of geometric data that is stored in the computer for the purposes of performing calculations and rendering two-dimensional (2-D) images. Such images may be stored for viewing later or displayed in real-time. A 3-D space may include a mathematical representation of a 3-D surface of an object. A 3-D model may be contained within a graphical data file. A 3-D model may represent a 3-D object using a collection of points in 3-D space, connected by various geometric entities such as triangles, lines, curved surfaces, etc. Being a collection of data (points and other information), 3-D models may be created by hand, algorithmically (procedural modeling), or scanned such as with a laser scanner. A 3-D model may be displayed visually as a two-dimensional image through a process called 3-D rendering, or used in non-graphical computer simulations and calculations. In some cases, the 3-D model may be physically created using a 3-D printing device.

A device may capture an image of the user and generate a 3-D model of the user from the image. A 3-D polygon mesh of an object may be placed in relation to the 3-D model of the user to create a 3-D virtual depiction of the user wearing the object (e.g., a pair of glasses, a hat, a shirt, a belt, etc.). This 3-D scene may then be rendered into a 2-D image to provide the user a virtual depiction of the user in relation to the object. Although some of the examples used herein describe articles of clothing, specifically a virtual try-on pair of glasses, it is understood that the systems and methods described herein may be used to virtually try-on a wide variety of products. Examples of such products may include glasses, clothing, foot-wear, jewelry, accessories, hair styles, etc.

FIG. 1 is a block diagram illustrating one embodiment of an environment 100 in which the present systems and methods may be implemented. In some embodiments, the systems and methods described herein may be performed on a single device (e.g., device 102). For example, a model generator 104 may be located on the device 102. Examples of devices 102 include mobile devices, smart phones, personal computing devices, computers, servers, etc.

In some configurations, a device 102 may include a model generator 104, a camera 106, and a display 108. In one example, the device 102 may be coupled to a database 110. In one embodiment, the database 110 may be internal to the device 102. In another embodiment, the database 110 may be external to the device 102. In some configurations, the database 110 may include polygon model data 112 and texture map data 114.

In one embodiment, the model generator 104 may enable a user to initiate a process to generate a 3-D model of the user. In some configurations, the model generator 104 may obtain multiple images of the user. For example, the model generator 104 may capture multiple images of a user via the camera 106. For instance, the model generator 104 may capture a video (e.g., a 5 second video) via the camera 106. In some configurations, the model generator 104 may use polygon model data 112 and texture map data 114 to generate a 3-D representation of a user. For example, the polygon model data 112 may include vertex coordinates of a polygon model of the user's head. In some embodiments, the model generator 104 may use color information from the pixels of multiple images of the user to create a texture map of the user. In some configurations, the model generator 104 may generate and/or obtain a 3-D representation of a product. For example, the polygon model data 112 and texture map data 114 may include a 3-D model of a pair of glasses. In some embodiments, the polygon model data 112 may include a polygon model of an object. In some configurations, the texture map data 114 may define a visual aspect (e.g., pixel information) of the 3-D model of the object such as color, texture, shadow, or transparency.

In some configurations, the model generator 104 may generate a virtual try-on image by rendering a virtual 3-D space that contains a 3-D model of a user and a 3-D model of a product. In one example, the virtual try-on image may illustrate the user with a rendered version of the product. In some configurations, the model generator 104 may output the virtual try-on image to the display 108 to be displayed to the user.

Figure 2:
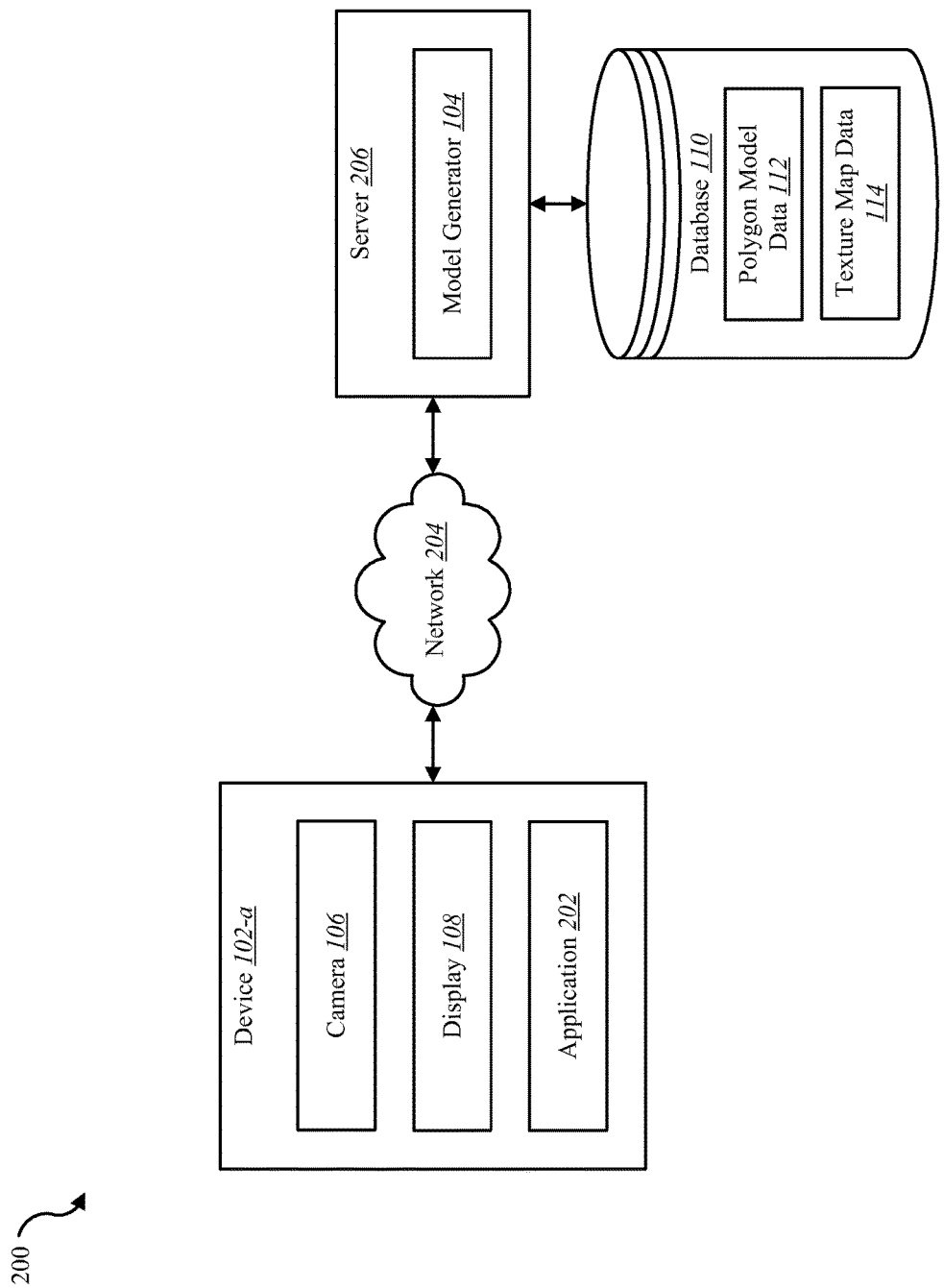
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 102-a may communicate with a server 206 via a network 204. Example of networks 204 include, local area networks (LAN), wide area networks (WAN), virtual private networks (VPN), wireless networks (using 802.11, for example), cellular networks (using 3G and/or LTE, for example), etc. In some configurations, the network 204 may include the internet. In some configurations, the device 102-a may be one example of the device 102 illustrated in FIG. 1. For example, the device 102-a may include the camera 106, the display 108, and an application 202. It is noted that in some embodiments, the device 102-a may not include a model generator 104. In some embodiments, both a device 102-a and a server 206 may include a model generator 104 where at least a portion of the functions of the model generator 104 are performed separately and/or concurrently on both the device 102-a and the server 206.

In some embodiments, the server 206 may include the model generator 104 and may be coupled to the database 110. For example, the model generator 104 may access the polygon model data 112 and the texture map data 114 in the database 110 via the server 206. The database 110 may be internal or external to the server 206.

In some configurations, the application 202 may capture multiple images via the camera 106. For example, the application 202 may use the camera 106 to capture a video. Upon capturing the multiple images, the application 202 may process the multiple images to generate result data. In some embodiments, the application 202 may transmit the multiple images to the server 206. Additionally or alternatively, the application 202 may transmit to the server 206 the result data or at least one file associated with the result data.

In some configurations, the model generator 104 may process multiple images of a user to generate a 3-D model of the user. The model generator 104 may render a 3-D space that includes the 3-D model of the user and a 3-D polygon model of an object to render a virtual try-on 2-D image of the object and the user. The application 202 may output a display of the user to the display 108 while the camera 106 captures an image of the user.

Figure 3:
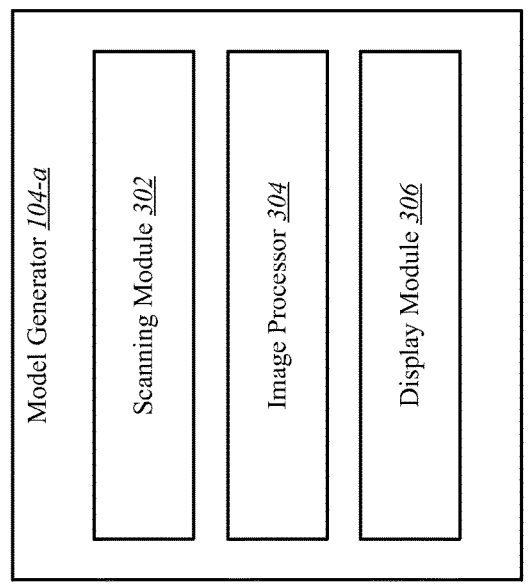
FIG. 3 is a block diagram illustrating one example of a model generator.

FIG. 3 is a block diagram illustrating one example of a model generator 104-*a*. The model generator 104-*a* may be one example of the model generator 104 depicted in FIGS. 1 and/or 2. As depicted, the model generator 104-*a* may include a scanning module 302, an image processor 304, and a display module 306.

In some configurations, the scanning module 302 may obtain a plurality of images of a user. In some embodiments, the scanning module 302 may activate the camera 106 to capture at least one image of the user. Additionally, or alternatively, the scanning module 302 may capture a video of the user.

In some embodiments, the image processor 304 may process an image of the user captured by the scanning module 302. The image processor 304 may be configured to generate a 3-D model of the user from the processing of the image. Operations of the image processor 304 are discussed in further detail below.

In some configurations, the display module 306 may display a real-time image of the user on a display (e.g. display 108) while obtaining the plurality of images of the user. For example, as the camera 106 captures an image of the user, the captured image of the user may be displayed on the display 108 to provide a visual feedback to the user. In some embodiments, the display module 306 may display a guideline on the display in relation to the displayed real-time image of the user. For example, one or more guidelines may provide a visual cue to the user. For instance, a guideline may provide a visual cue of the direction in which the user should be holding the device 102 (e.g., a tablet computing device in landscape or portrait mode). Additionally, a guideline may provide a visual leveling cue to assist the user in maintaining the device relatively level or in the same plane while the user pans or rotates the device 102 around him- or herself. Additionally, a guideline may provide the user a visual depth cue to assist the user in maintaining the device at a relatively same depth (e.g., at arm's length) while the user pans or rotates the device 102 around the user.

Figure 4:
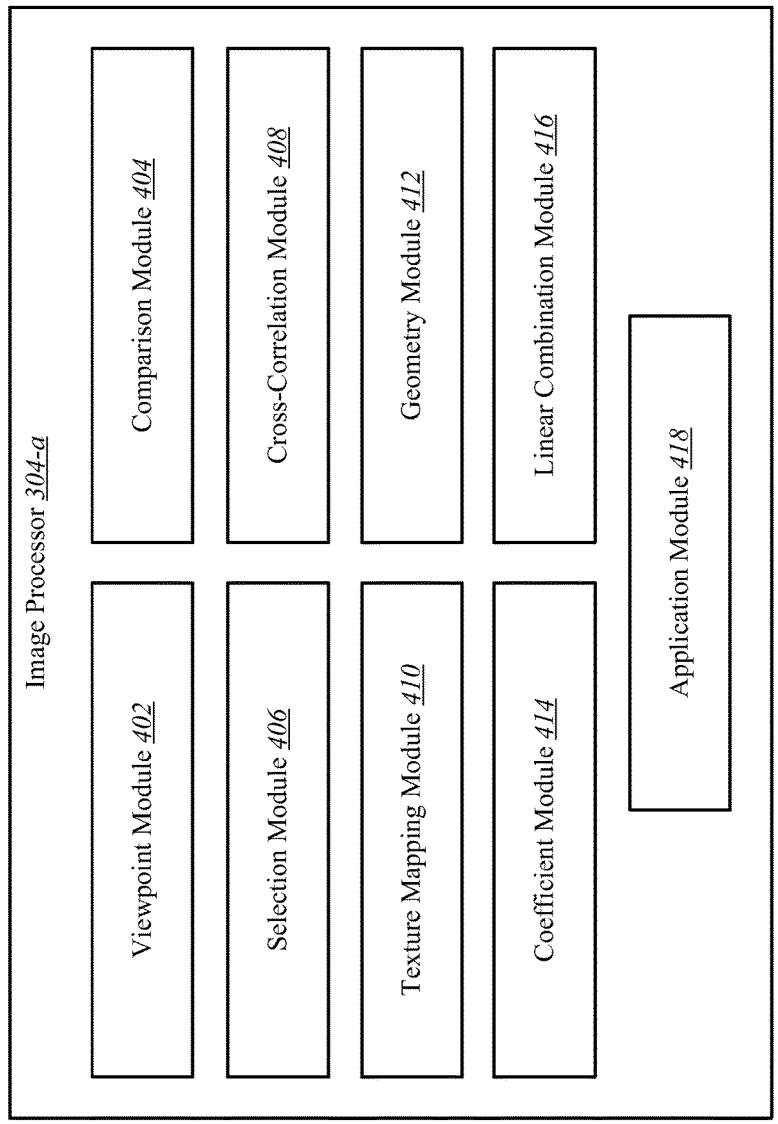
FIG. 4 is a block diagram illustrating one example of an image processor.

FIG. 4 is a block diagram illustrating one example of an image processor 304-*a*. The image processor 304-*a* may be one example of the image processor 304 illustrated in FIG. 3. As depicted, the image processor 304 may include a viewpoint module 402, a comparison module 404, a selection module 406, and a cross-correlation module 408. Additionally, the image processor 304-*a* may include a texture mapping module 410, a geometry module 412, a coefficient module 414, a linear combination module 416, and an application module 418.

In some configurations, the viewpoint module 402 may calculate an angle of view relative to the user pictured in at least one of the plurality of images. For example, the viewpoint module 402 may determine that in one image of the user's head, the user held the device 102 10-degrees to the left of center of the user's face. The comparison module 404 may determine whether the calculated angle of view (e.g., 10-degrees to the left of center of the user's face) matches a predetermined viewing angle. In some embodiments, the predetermined viewing angle includes a plurality of evenly spaced 10-degree rotation steps. For example, a head-on image showing the user facing the camera directly may be selected as a viewing angle reference point, or 0-degrees. The next predetermined viewing angles in either direction may include +/−10-degrees, +/−20-degrees, +/−30-degrees, and so forth, in 10-degree increments. Thus, the comparison module 404 may determine that an image depicting the user holding the device 102 10-degrees to the left of center of the user's face matches a predetermined viewing angle of +10-degrees (or −10-degrees).

In some embodiments, upon determining the calculated angle of view matches the predetermined viewing angle, the selection module 406 may select at least one of the plurality of images. For example, the selection module 406 may select an image for further processing. The cross-correlation module 408 may perform a cross-correlation algorithm to track a feature between two or more of the plurality of images of the user. For example, the image processor 304-*a*, via the cross-correlation module 408, may perform template matching. Additionally, or alternatively, the image processor 304-*a*, via the cross-correlation module 408, may perform a structure from motion algorithm to track features in the images of the user. From the detected features of the user, the image processor 304-*a* may construct a 3-D model of the user.

In some configurations, the texture mapping module 410 may generate texture coordinate information from the determined 3-D structure of the user. The texture coordinate information may relate a two-dimensional (2-D) coordinate (e.g., UV coordinates) of each selected image to a 3-D coordinate (e.g., XYZ coordinates) of the 3-D model of the user.

In one embodiment, the geometry module 412 generates at least one geometry file to store data related to a 3-D structure. Each at least one geometry file may include a plurality of vertices corresponding to a universal morphable model. For instance, each geometry file may include a different generic model of a user, where each model depicts a user with certain features and characteristics. For example, one geometry file may include a polygon mesh depicting characteristics typical of a male-looking face. Another geometry file may include a polygon mesh depicting characteristics of a female-looking face, and so forth.

In some configurations, the coefficient module 414 calculates a coefficient for each generated geometry file based on the determined 3-D structure of the user. The linear combination module 416 may combine linearly each generated geometry file based on each calculated coefficient to generate a polygon mesh of the user. In other words, each coefficient may act as a weight to determine how much each particular geometry file affects the outcome of linearly combining each geometry file. For example, if the user is a female, then the coefficient module 414 may associate a relatively high coefficient (e.g., 1.0) to a geometry file that depicts female characteristics, and may associate a relatively low coefficient (e.g., 0.01) to a geometry file that depicts male characteristics. Thus, each geometry file may be combined linearly, morphing a 3-D polygon mesh to generate a realistic model of the user based on the 3-D characteristics of the user calculated from one or more captured images of the user. The application module 418 may apply each selected image to the generated polygon mesh of the user according to the generated texture coordinate information, resulting in a 3-D model of the user.

Figure 5:
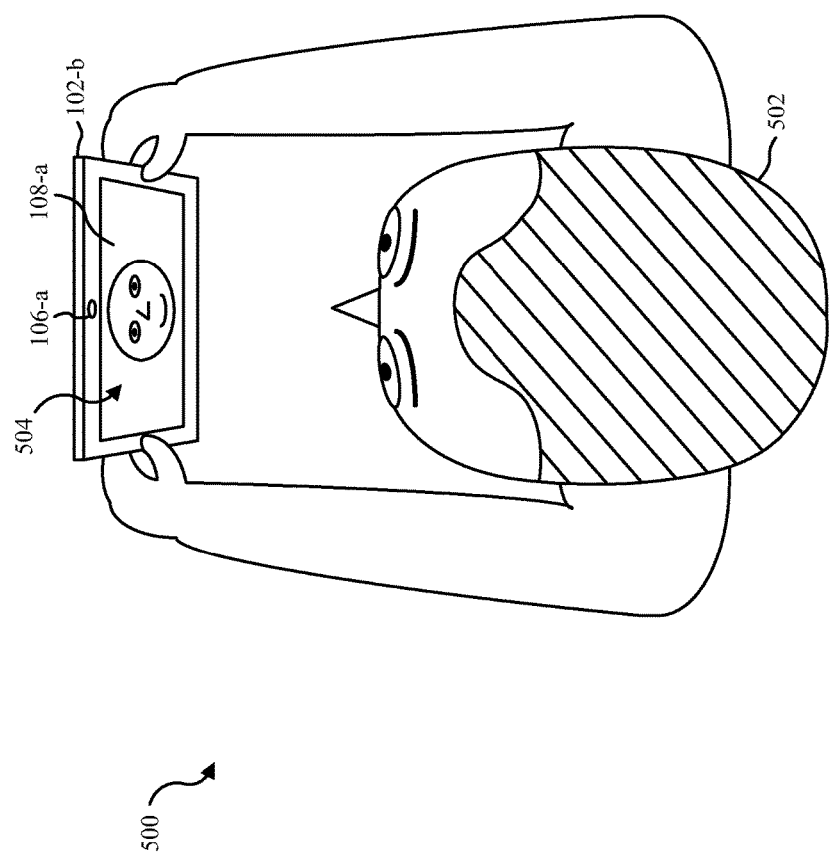
FIG. 5 illustrates an example arrangement for capturing an image of a user.

FIG. 5 illustrates an example arrangement 500 for capturing an image 504 of a user 502. In particular, the illustrated example arrangement 500 may include the user 502 holding a device 102-*b*. The device 102-*b* may include a camera 106-*a* and a display 108-*a*. The device 102-*b*, camera 106-*a*, and display 108-*a* may be examples of the device 102, camera 106, and display 108 depicted in FIGS. 1 and/or 2.

In one example, the user 502 holds the device 102-*b* at arm's length with the camera 106-*a* activated. The camera 106-a may capture an image 504 of the user and the display 108-a may show the captured image 504 to the user 502 (e.g., a real-time feedback image of the user). In some configurations, the camera 106-a may capture a video of the user 502. In some embodiments, the user may pan the device 102-b around the user's face to allow the camera 106-a to capture a video of the user from one side of the user's face to the other side of the user's face. Additionally, or alternatively, the user 502 may capture an image of other areas (e.g., arm, leg, torso, etc.).

Figure 6:
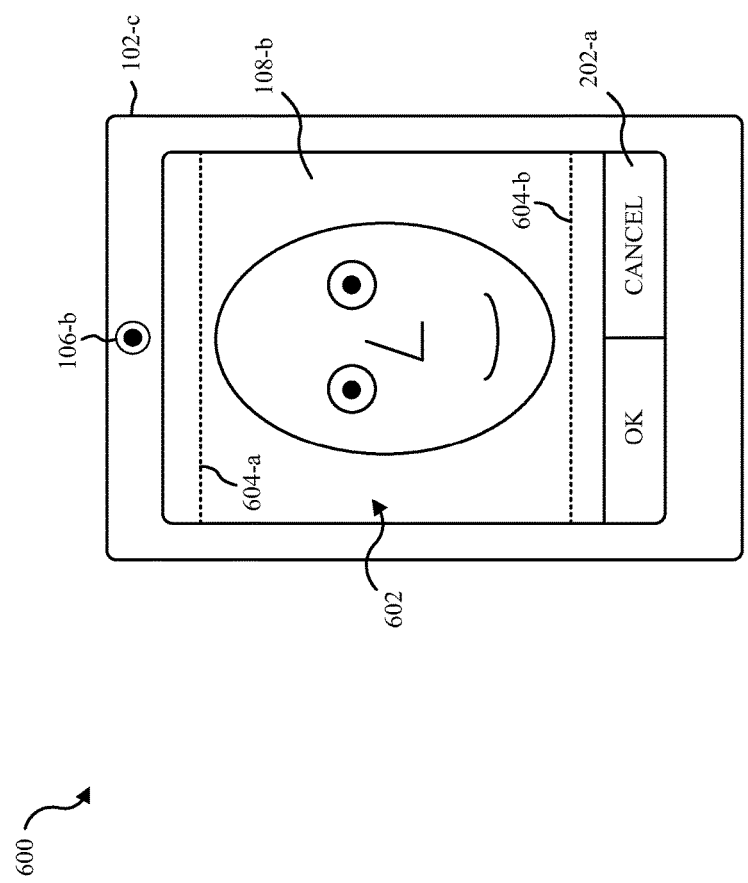
FIG. 6 is a diagram illustrating an example of a device for capturing an image of a user.

FIG. 6 is a diagram 600 illustrating an example of a device 102-c for capturing an image 602 of a user. The device 102-c may be one example of the device 102 illustrated in FIGS. 1 and/or 2. As depicted, the device 102-c may include a camera 106-b, a display 108-b, and an application 202-a. The camera 106-b, display 108-b, and application 202-a may each be an example of the respective camera 106, display 108, and application 202 illustrated in FIGS. 1 and/or 2.

In one embodiment, the user may operate the device 102-c. For example, the application 202-a may allow the user to interact with and/or operate the device 102-c. In one embodiment, the application 202-a may allow the user to capture an image 605 of the user. For example, the application 202-a may display the captured image 602 on the display 108-b. In some cases, the application 202-a may permit the user to accept or decline the image 602 that was captured.

Figure 7:
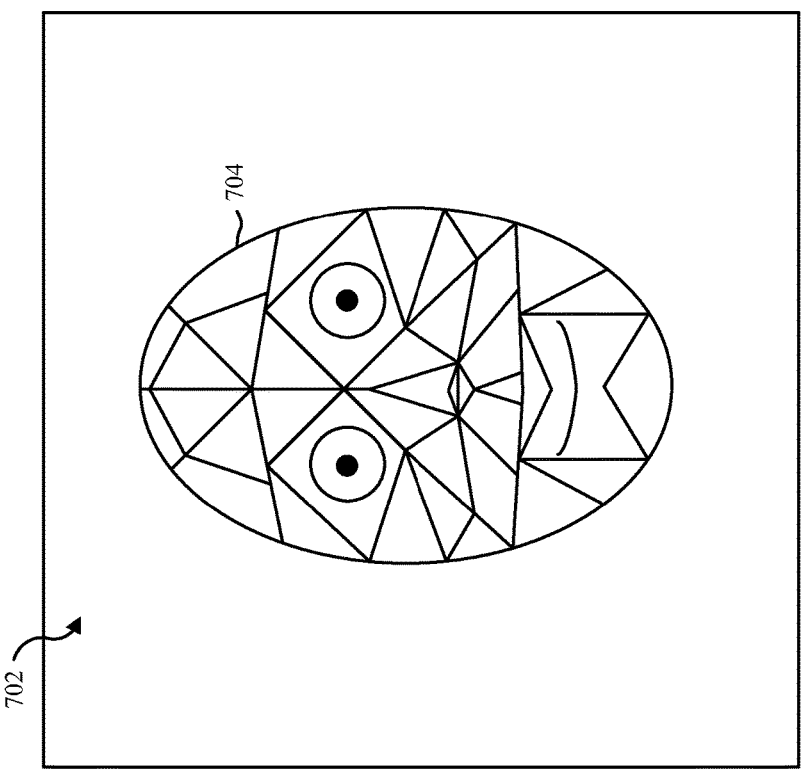
FIG. 7 illustrates an example arrangement of a virtual 3-D space including a depiction of a 3-D model of a user.

FIG. 7 illustrates an example arrangement 700 of a virtual 3-D space 702. As depicted, the 3-D space 702 of the example arrangement 700 may include a 3-D model of a user's head 704. In some embodiments, the 3-D model of the user's head 704 may include a polygon mesh model of the user's head, which may be stored in the database 110 as polygon data 112. The polygon data 112 of the 3-D model of the user may include 3-D polygon mesh elements such as vertices, edges, faces, polygons, surfaces, and the like. Additionally, or alternatively, the 3-D model of the user's head 704 may include at least one texture map, which may be stored in the database 110 as texture map data 114.

Figure 8:
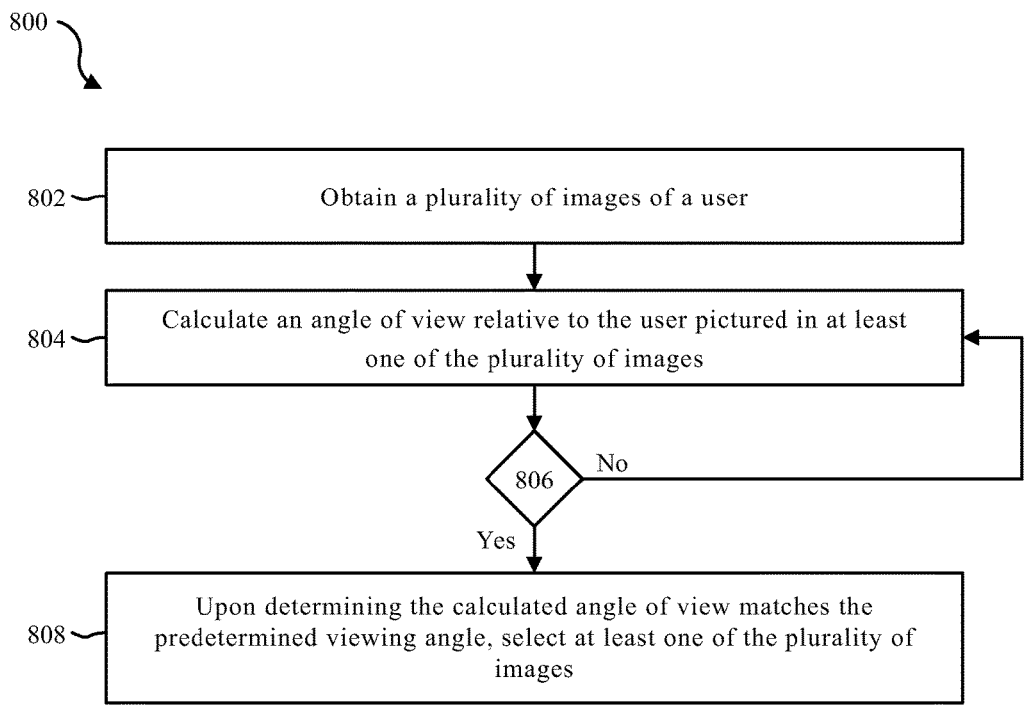
FIG. 8 is a flow diagram illustrating one embodiment of a method for generating a 3-D model of a user.

FIG. 8 is a flow diagram illustrating one embodiment of a method 800 for generating a 3-D model of a user. In some configurations, the method 800 may be implemented by the model generator 104 illustrated in FIGS. 1, 2, and/or 4. In some configurations, the method 800 may be implemented by the application 202 illustrated in FIG. 2.

At block 802, a plurality of images of a user may be obtained. At block 804, an angle of view relative to the user pictured in at least one of the plurality of images may be calculated. At block 806, it may be determined whether the calculated angle of view matches a predetermined viewing angle. In some configurations, the predetermined viewing angle includes a plurality of rotation steps. As explained above, in some configurations, the predetermined viewing angle includes a plurality of evenly spaced 10-degree rotation steps. At block 808, upon determining the calculated angle of view matches the predetermined viewing angle, at least one of the plurality of images may be selected. Upon determining the calculated angle of view does not match the predetermined viewing angle, the method returns to block 804.

Figure 9:
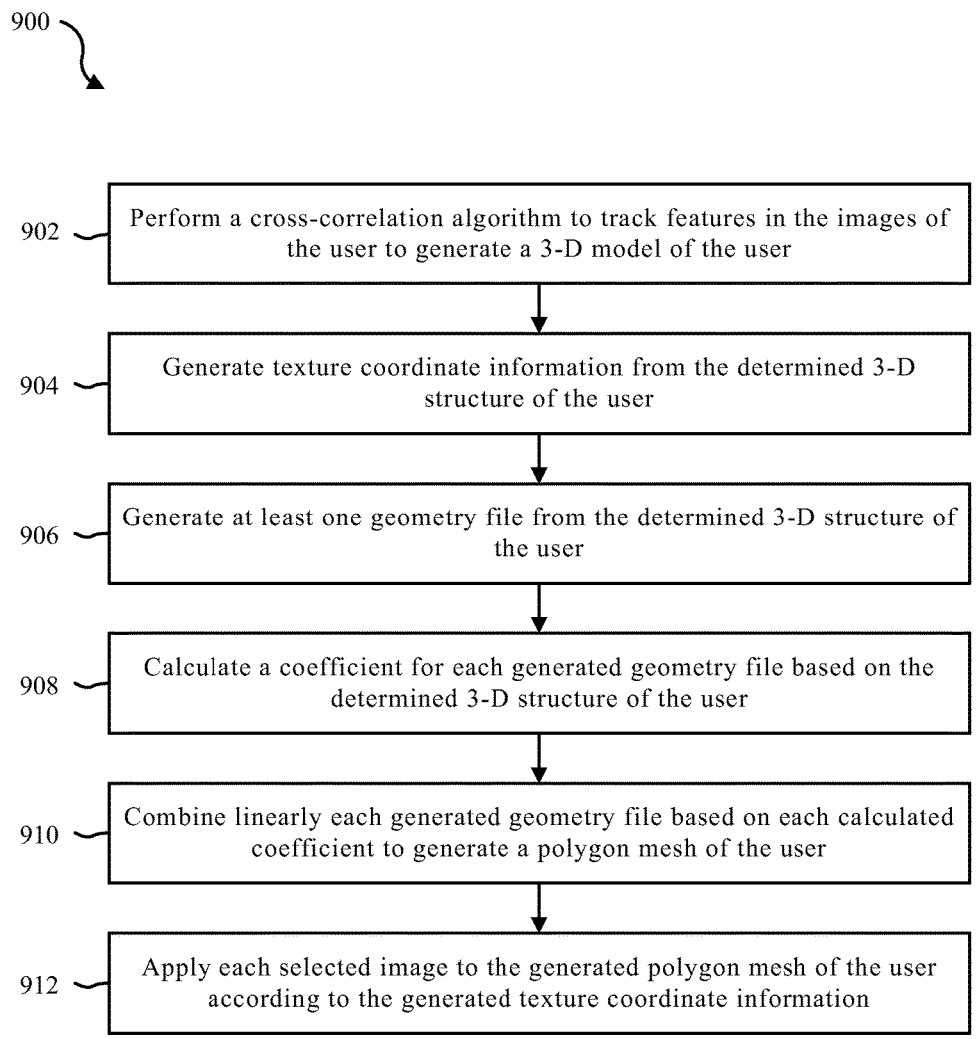
FIG. 9 is a flow diagram illustrating one embodiment of a method for applying an image of a user to a polygon mesh model of the user.

FIG. 9 is a flow diagram illustrating one embodiment of a method 900 for applying an image of a user to a polygon mesh model of the user. In some configurations, the method 900 may be implemented by the model generator 104 illustrated in FIGS. 1, 2, and/or 4. In some configurations, the method 900 may be implemented by the application 202 illustrated in FIG. 2.

At block 902, a cross-correlation algorithm to track features in the images of the user to determine a 3-D structure of the user. At block 904, texture coordinate information may be generated from the determined 3-D structure of the user. As explained above, the texture coordinate information may relate a 2-D coordinate (e.g., UV coordinates) of each selected image to a 3-D coordinate (e.g., XYZ coordinates) of the 3-D model of the user.

At block 906, at least one geometry file may be generated to store data related to a 3-D structure. As explained above, each at least one geometry file may include a plurality of vertices corresponding to a universal morphable model. At block 908, a coefficient for each generated geometry file based on the determined 3-D structure of the user may be calculated. At block 910, each generated geometry file may be combined linearly based on each calculated coefficient to generate a polygon mesh of the user. At block 912, each selected image may be applied to the generated polygon mesh of the user according to the generated texture coordinate information.

Figure 10:
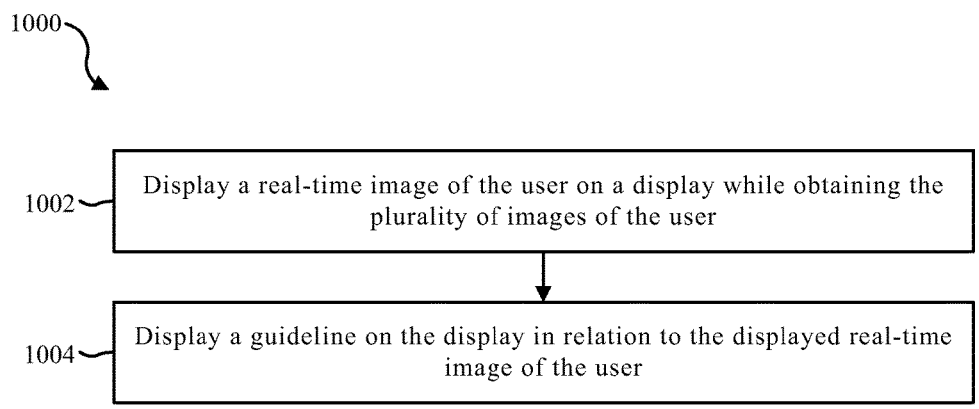
FIG. 10 is a flow diagram illustrating one embodiment of a method for displaying a feedback image to a user.

FIG. 10 is a flow diagram illustrating one embodiment of a method 1000 for displaying a feedback image to a user. In some configurations, the method 1000 may be implemented by the model generator 104 illustrated in FIGS. 1, 2, and/or 4. In some configurations, the method 1000 may be implemented by the application 202 illustrated in FIG. 2.

At block 1002, a real-time image of the user may be displayed on a display (e.g., display 108) while obtaining the plurality of images of the user. As explained above, as the camera 106 captures an image of the user, the captured image of the user may be displayed on the display 108 to provide a visual feedback to the user. At block 1004, a guideline on the display in relation to the displayed real-time image of the user may be displayed. One or more guidelines may provide a visual cue to the user while an image is being captured.

Figure 11:
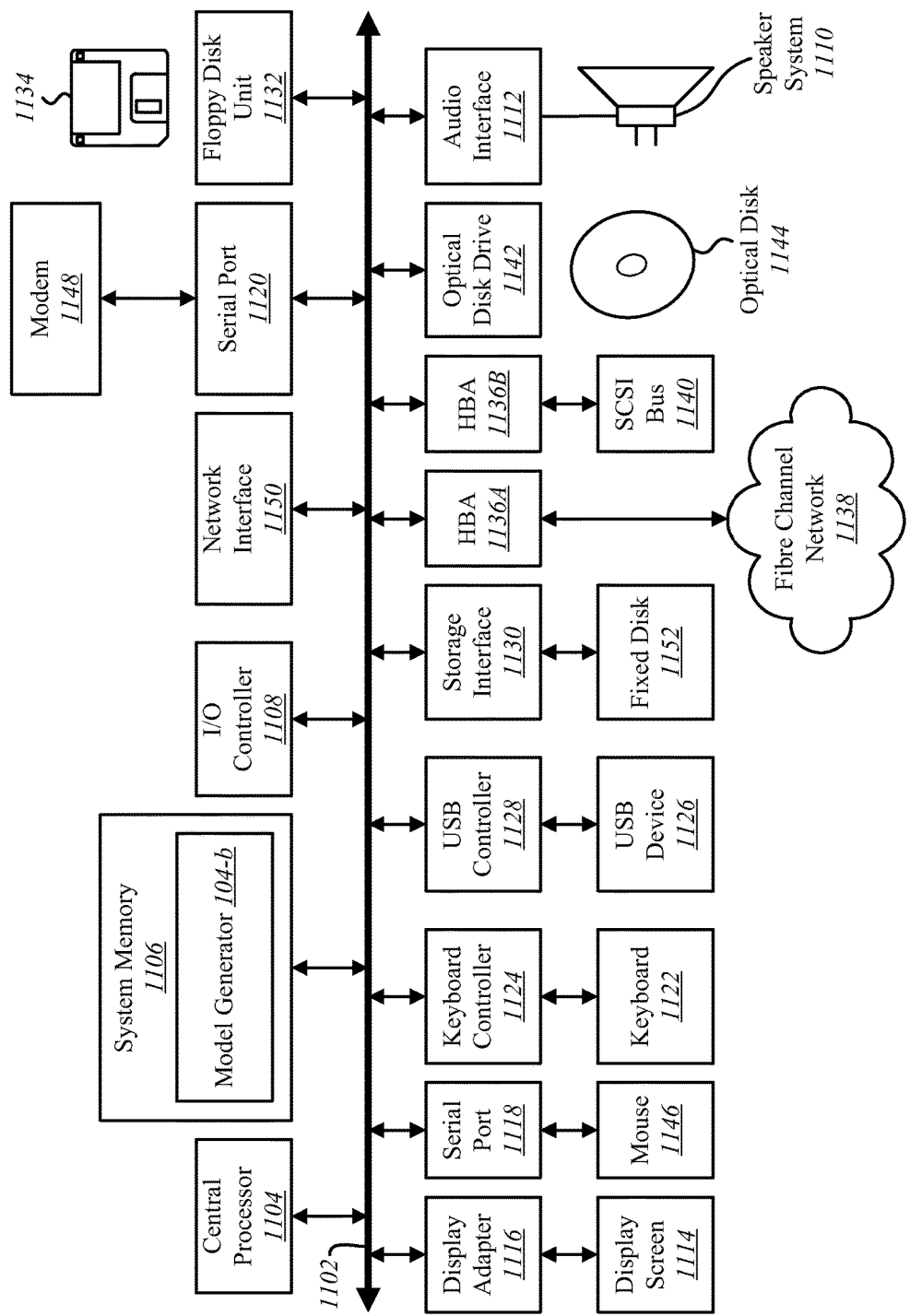
FIG. 11 depicts a block diagram of a computer system suitable for implementing the present systems and methods.

FIG. 11 depicts a block diagram of a computer system 1100 suitable for implementing the present systems and methods. The depicted computer system 1100 may be one example of a server 206 depicted in FIG. 2. Alternatively, the system 1100 may be one example of a device 102 depicted in FIGS. 1, 2, 5, and/or 6. Computer system 1100 includes a bus 1102 which interconnects major subsystems of computer system 1100, such as a central processor 1104, a system memory 1106 (typically RAM, but which may also include ROM, flash RAM, or the like), an input/output controller 1108, an external audio device, such as a speaker system 1110 via an audio output interface 1112, an external device, such as a display screen 1114 via display adapter 1116, serial ports 1118 and mouse 1146, a keyboard 1122 (interfaced with a keyboard controller 1124), multiple USB devices 1126 (interfaced with a USB controller 1128), a storage interface 1130, a host bus adapter (HBA) interface card 1136A operative to connect with a Fibre Channel network 1138, a host bus adapter (HBA) interface card 1136B operative to connect to a SCSI bus 1140, and an optical disk drive 1142 operative to receive an optical disk 1144. Also included are a mouse 1146 (or other point-and-click device, coupled to bus 1102 via serial port 1118), a modem 1148 (coupled to bus 1102 via serial port 1120), and a network interface 1150 (coupled directly to bus 1102).

Bus 1102 allows data communication between central processor 1104 and system memory 1106, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a model generator 104-*b* to implement the present systems and methods may be stored within the system memory 1106. The model generator 104-*b* may be one example of the model generator 104 depicted in FIGS. 1, 2, and/or 3. Applications resident with computer system 1100 are generally stored on and accessed via a non-transitory computer readable medium, such as a hard disk drive (e.g., fixed disk 1152), an optical drive (e.g., optical drive 1142), or other storage medium. Additionally, applications can be in the form of electronic signals modulated in accordance with the application and data communication technology when accessed via network modem 1148 or interface 1150.

Storage interface 1130, as with the other storage interfaces of computer system 1100, can connect to a standard computer readable medium for storage and/or retrieval of information, such as a fixed disk drive 1152. Fixed disk drive 1152 may be a part of computer system 1100 or may be separate and accessed through other interface systems. Modem 1148 may provide a direct connection to a remote server via a telephone link or to the Internet via an internet service provider (ISP). Network interface 1150 may provide a direct connection to a remote server via a direct network link to the Internet via a POP (point of presence). Network interface 1150 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present systems and methods. The devices and subsystems can be interconnected in different ways from that shown in FIG. 11. The operation of at least some of the computer system 1100 such as that shown in FIG. 11 is readily known in the art and is not discussed in detail in this application. Code to implement the present disclosure can be stored in a non-transitory computer-readable medium such as one or more of system memory 1106, fixed disk 1152, or optical disk 1144. The operating system provided on computer system 1100 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computing device configured to generate a three-dimensional (3-D) model of a user, comprising:
   a processor; and
   memory in electronic communication with the processor, wherein the memory is configured to store a plurality of geometry files and instructions, the instructions being executable by the processor to:

obtain a plurality of images of the user, wherein the images of the user have one or more angles of view;
generate the 3-D model of the user using the plurality of images, the instructions to generate comprising instructions to:
select one or more physical characteristics of the user from the plurality of images of the user;
calculate a respective coefficient for each of the plurality of geometry files based on the one or more physical characteristics of the user;
track the one or more physical characteristics of the user across at least two images of the plurality of images of the user, based on the plurality of geometry files and an algorithm; and
combine the plurality of geometry files based on at least one of the respective coefficients to create the 3-D model to represent the user; and
generate a combined image of the user together with a product, the combined image comprising the 3-D model of the user and a rendered image of a 3-D model of the product.

2. The device of claim 1, wherein the instructions to generate the 3-D model of the user further comprise instructions to provide a universal morphable model; and
instructions to adjust the universal morphable model based on the respective coefficients of each of the plurality of geometry files.

3. The device of claim 1, wherein the one or more physical characteristics of the user correspond to at least one of the plurality of images of the user;
wherein the instructions to select the one or more physical characteristics of the user comprise:
instructions to detect a feature of the user; and
instructions to track the detected feature of the user between at least two of the plurality of images of the user.

4. The device of claim 1, wherein the processor is further configured to calculate an angle of view of a camera used to capture the plurality of images relative to the user.

5. The device of claim 3, wherein the processor is further configured to perform a cross-correlation algorithm to track the detected feature.

6. The computing device of claim 1, wherein each of the plurality of geometry files comprises a different polygon mesh model with different features.

7. The computing device of claim 6, wherein the plurality of geometry files further comprises at least one first polygon mesh depicting a first set of facial characteristics and at least one second polygon mesh depicting a second set of facial characteristics.

8. The computing device of claim 1, further comprising instructions stored in the memory, the instructions being executable by the processor to linearly combine the plurality of geometry files based on each respective coefficient.

9. The computing device of claim 8, wherein an effect of each of the geometry files on the 3-D model of the user is weighted, based on each respective coefficient.

10. The computing device of claim 6, wherein each polygon mesh model comprises at least one of a plurality of vertices and a plurality of texture coordinates.

11. The computing device of claim 1, further comprising a universal morphable model, wherein the universal morphable model comprises at least one of a plurality of vertices and a plurality of texture coordinates corresponding to at least one of the geometry files.

12. The computing device of claim 1, wherein the instructions being executable by the processor to select one or more physical characteristics of the user further comprise instructions executable by the processor to:
determine a 3-D structure of the user from the plurality of images; and
select one or more physical characteristics of the user from the determined 3-D structure of the user.

13. The computing device of claim 1, wherein the algorithm to track the one or more physical characteristics comprises at least one of a cross-correlation algorithm and a structure-from-motion algorithm.

14. The computing device of claim 1, wherein the processor is further configured to determine whether an angle of view of a camera used to capture an image of the plurality of images relative to the user is one of a predetermined set of viewing angles.

15. A method comprising:
obtaining a plurality of images of a user, wherein the images of the user have one or more angles of view;
generating, by at least one processor, a 3-D model of the user using the plurality of images, the generating comprising:
selecting one or more physical characteristics of the use from the plurality of images of the user;
accessing a plurality of geometry files stored in a memory;
calculating a respective coefficient for each of the plurality of geometry files based on the one or more physical characteristics of the user;
tracking the one or more physical characteristics of the user across at least two images of the plurality of images of the user, based on the plurality of geometry files and an algorithm; and
combining the plurality of geometry files based on at least one of the respective coefficients to create the 3D model of the user; and
generating, by the at least one processor, a combined image of the user together with a product, the combined image comprising the generated 3-D model of the user and a rendered image of a 3-D model of the product.

16. The method of claim 15, wherein the generating the 3-D model of the user further comprises providing a universal morphable model; and
adjusting the universal morphable model based on at least one of the respective coefficients of at least one of the plurality of geometry files.

17. The method of claim 15, wherein the one or more physical characteristics of the user correspond to at least one of the plurality of images of the user, wherein selecting the one or more physical characteristics of the user comprises: detecting a feature of the user.

18. The method of claim 15, wherein each of the plurality of geometry files comprises a different generic polygon mesh model with different features.

19. The method of claim 18, wherein the plurality of geometry files include at least one polygon mesh depicting a first set of facial characteristics and at least one polygon mesh depicting a second set of facial characteristics.

20. The method of claim 15, further comprising the processor linearly combining the plurality of geometry files based on each respective coefficient.

21. The method of claim 20, further comprising the processor weighting, based on the respective coefficients, an effect of each of the geometry files on the 3-D model of the user.

22. The method of claim 15, wherein selecting one or more physical characteristics of the user further comprises:

determining a 3-D structure of the user from the plurality of images; and selecting one or more physical characteristics of the user from the determined 3-D structure of the user.

23. The method of claim 15, wherein the algorithm to track the one or more physical characteristics comprises at least one of a cross-correlation algorithm and a structure-from-motion algorithm.

24. The method of claim 15, wherein the processor is further configured to determine whether an angle of view of a camera used to capture an image of the plurality of images relative to the user is one of a predetermined set of viewing angles.

25. A computer-program product comprising a non-transitory computer-readable medium storing instructions thereon, the instructions being executable by the processor to:

obtain a plurality of images of a user, wherein the images of the user have one or more angles of view;

generate a 3-D model of the user using the plurality of images, the instructions to generate comprising instructions to:

select one or more physical characteristics of the user from the plurality of images of the user;

calculate a respective coefficient for each of a plurality of geometry files, based on the one or more physical characteristics of the user;

track the one or more physical characteristics of the user across at least two images of the plurality of images of the user, based on the plurality of geometry files and an algorithm; and combine the plurality of geometry files based on the respective coefficients to create the 3-D model to represent the user; and generate a combined image of the user with a product, the combined image comprising the 3-D model of the user and a rendered image of a 3-D model of the product.

26. The computer-program product of claim 25, wherein the instructions to generate the 3-D model of the user further comprises instructions being executable by the processor to:

provide a universal morphable model; and adjust the universal morphable model based on the respective coefficients of each of the plurality of geometry files.

27. The computer-program product of claim 26, wherein the instructions to select one or more physical characteristics are executable by the processor to:

detect a feature of the user.

28. The computer-program product of claim 27, wherein the instructions to generate the 3-D model are further executable by the processor to:

linearly combine the plurality of geometry files based on each respective coefficient; and weight an effect of each of the geometry files on the 3-D model to represent the user.

29. The computer-program product of claim 25, wherein the instructions to select one or more physical characteristics of the user further comprise instructions executable by the processor to:

determine a 3-D structure of the user from the plurality of images; and select one or more physical characteristics of the user from the determined 3-D structure of the user.

30. The computer-program product of claim 25, wherein the algorithm to track the one or more physical characteristics comprises at least one of a cross-correlation algorithm and a structure-from-motion algorithm.

31. The computer-program product of claim 25, wherein the processor is further configured to determine whether an angle of view of a camera used to capture an image of the plurality of images relative to the user is one of a predetermined set of viewing angles.

* * * * *

UNITED STATES PATENT AND TRADEMARK OFFICE
CERTIFICATE OF CORRECTION

PATENT NO. : 10,147,233 B2  
APPLICATION NO. : 14/698655  
DATED : December 4, 2018  
INVENTOR(S) : Engle et al.

Page 1 of 1

It is certified that error appears in the above-identified patent and that said Letters Patent is hereby corrected as shown below:

In the Claims

In Column 12, Line 23, please replace "characteristics of the use" with --characteristics of a user--.

In Column 12, Line 36, please replace "3D model" with --3-D model--.

Signed and Sealed this  
Fourteenth Day of May, 2019

Andrei Iancu  
*Director of the United States Patent and Trademark Office*